April 7, 1936. A. R. SHINN ET AL 2,036,367
BRICK BLOCK AND TILE MOLDING MACHINE
Filed July 5, 1928 5 Sheets-Sheet 5

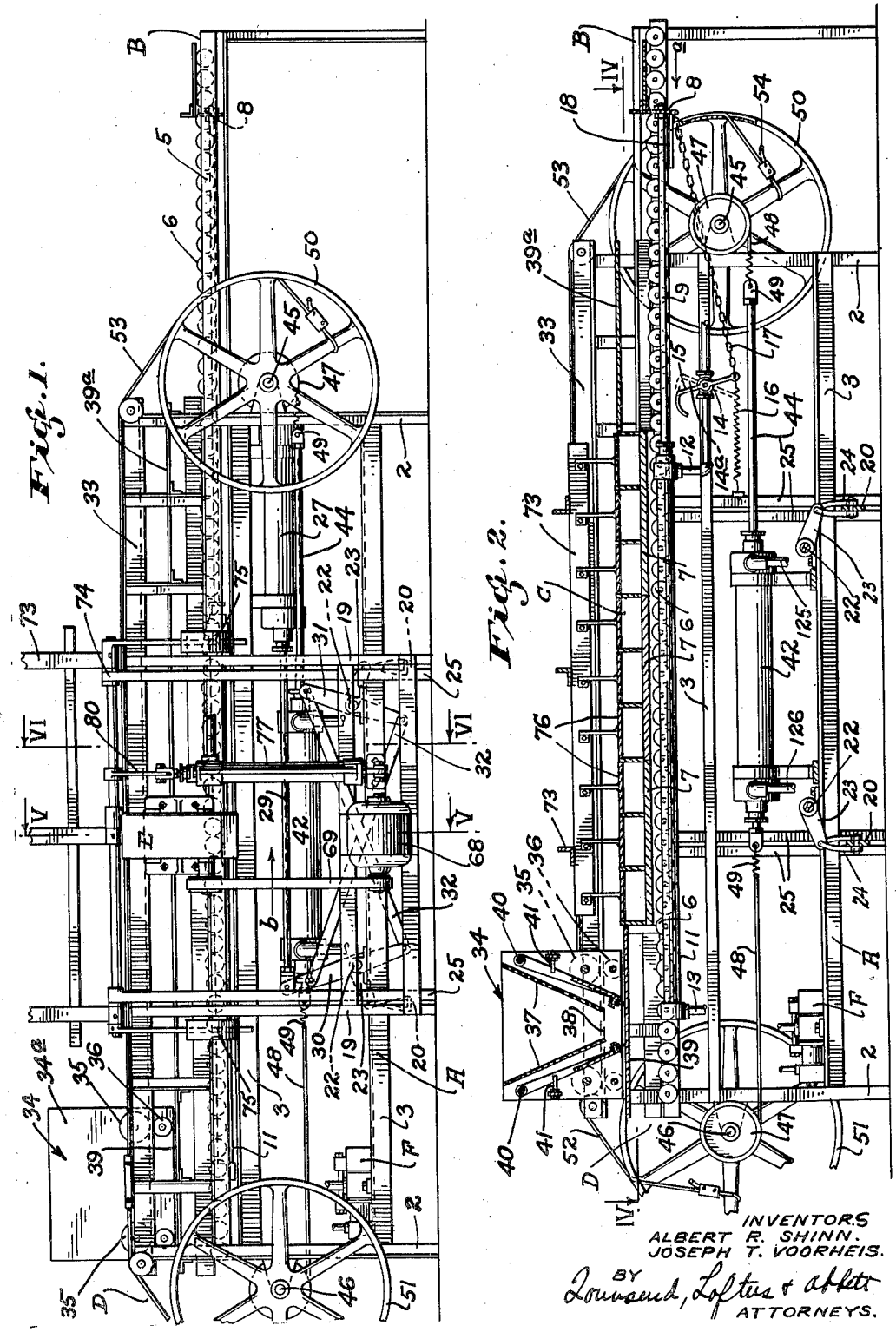

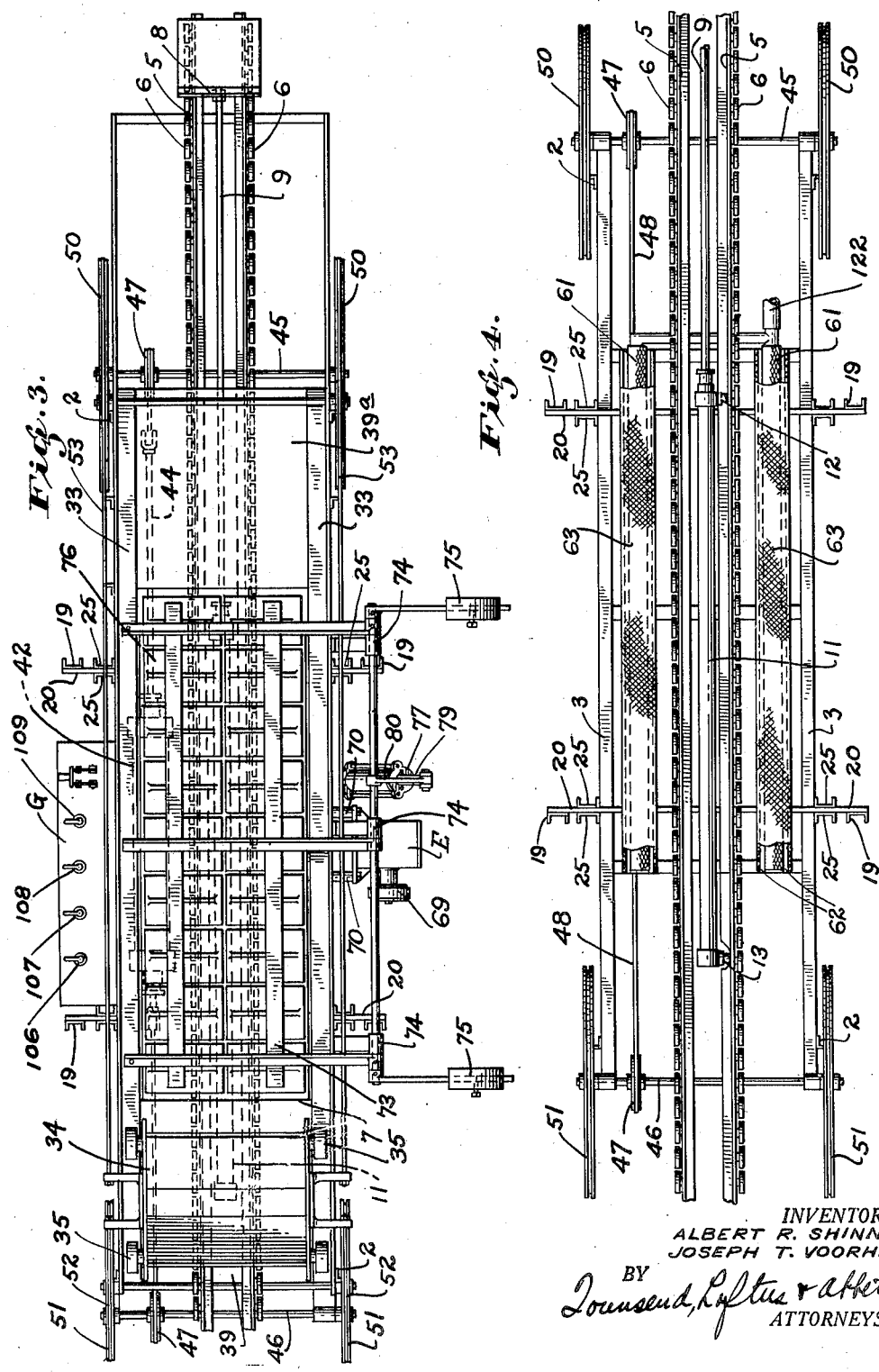

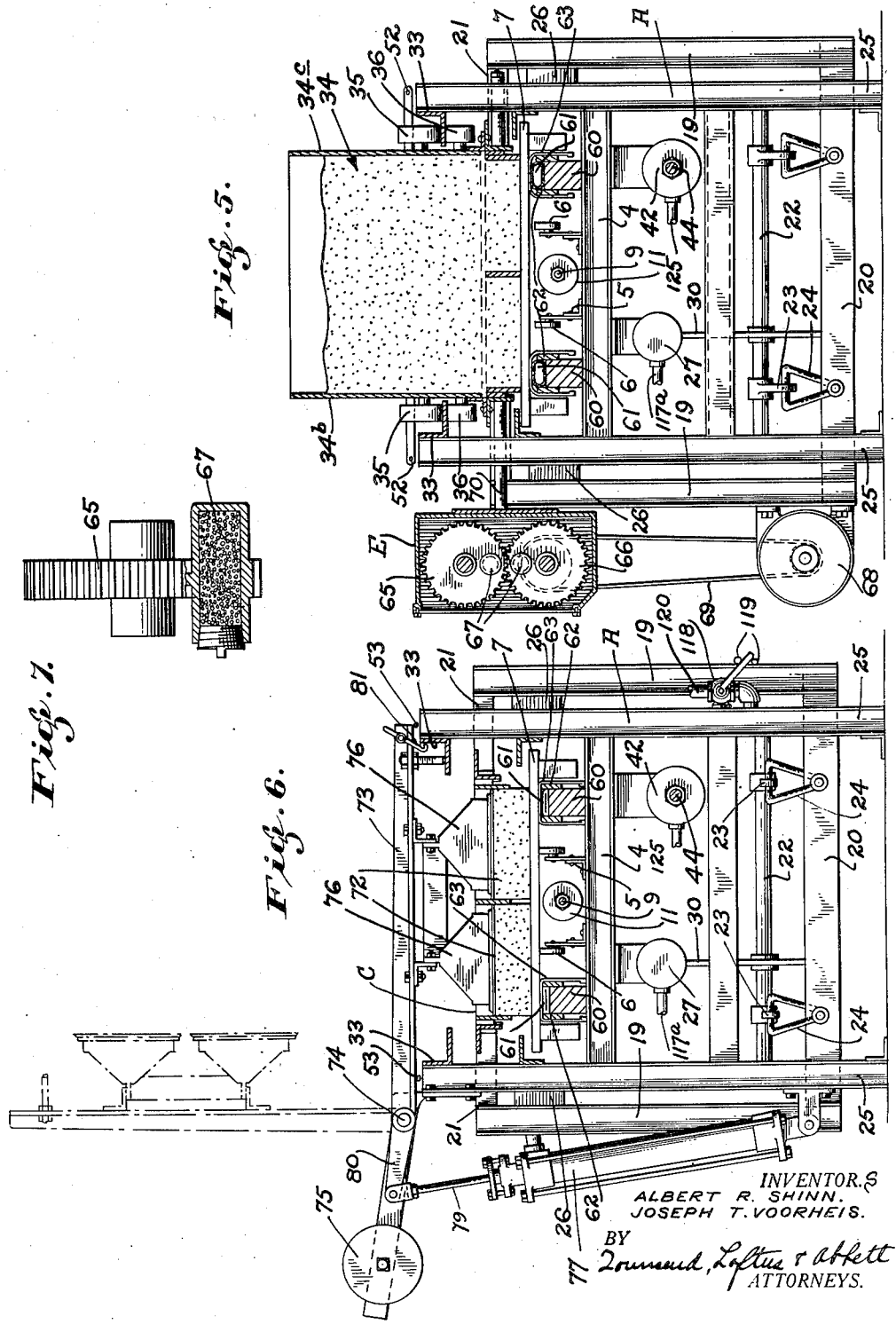

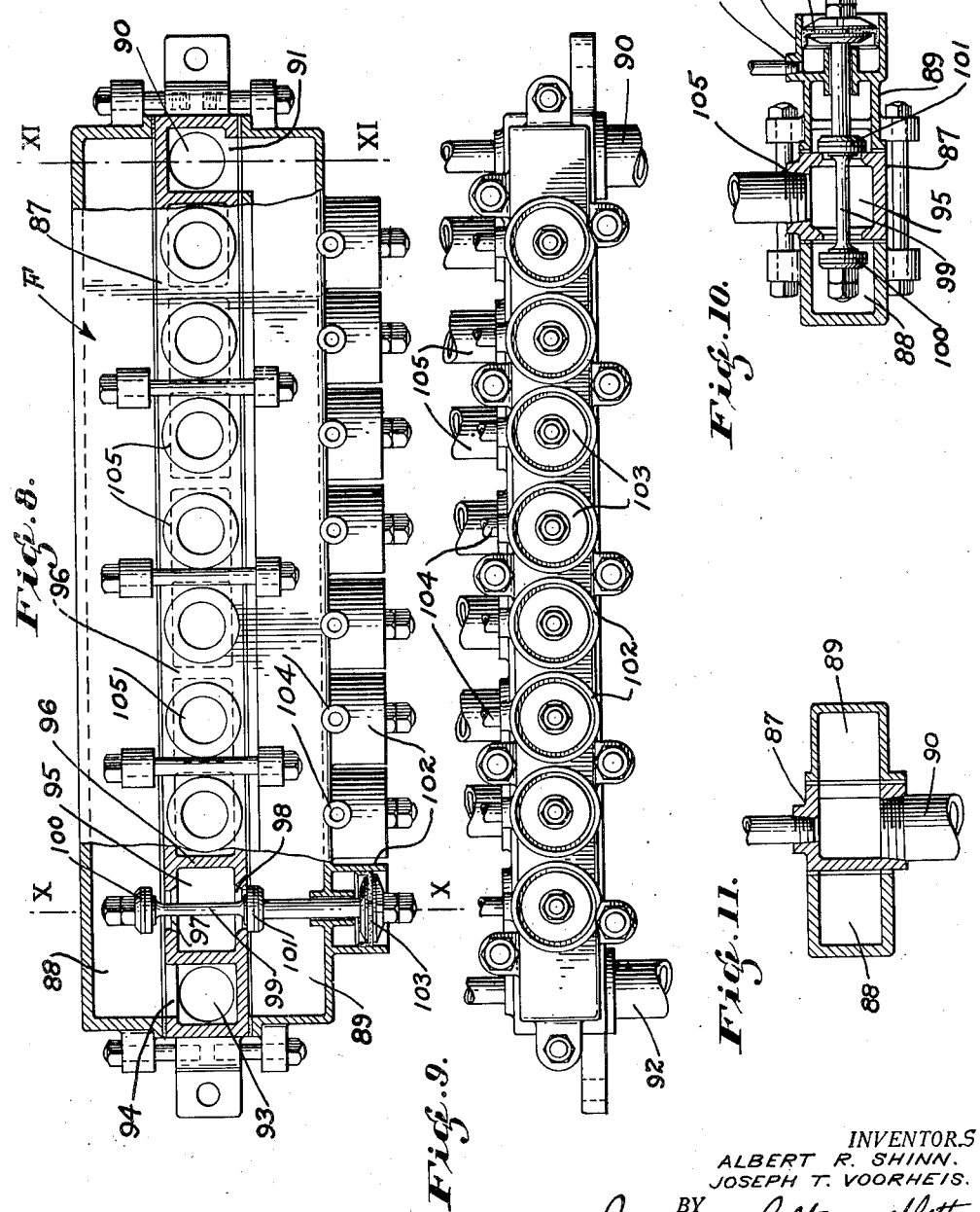

INVENTORS
ALBERT R. SHINN.
JOSEPH T. VOORHEIS.
BY
Townsend, Loftus & Abbett
ATTORNEYS.

Patented Apr. 7, 1936

2,036,367

UNITED STATES PATENT OFFICE 2,036,367

BRICK BLOCK AND TILE MOLDING MACHINE

Albert R. Shinn, Berkeley, and Joseph T. Voorheis, Oakland, Calif., assignors to American Concrete Units Co. Inc., San Francisco, Calif., a corporation of Nevada Application July 5, 1928, Serial No. 290,347

18 Claims. (Cl. 25—41)

This invention relates to a brick, block and tile molding machine, and particularly to a machine which is adapted to mold articles from wet or plastic concrete in which a large proportion of coarse aggregate is used.

The object of the present invention is to generally improve and simplify the construction and operation of machines of the character described, and especially to provide a machine which is adapted for quantity production where a plastic mix is employed.

The invention, briefly stated, embodies a main frame in which are mounted one or more molds. A roller conveyor is disposed below the molds and extends longitudinally of the frame. It serves the function of supporting one or more pallets which co-operate with the mold. Means are provided for delivering empty pallets to the molds and for removing pallets loaded with the molded product. Means are provided whereby a tight contact between the lower ends of the molds and the pallets is maintained during the filling and molding operation. A movable or reciprocally mounted hopper is provided for filling the molds. A co-operating mechanism is provided whereby a shaking movement is transmitted to the molds to settle the concrete during the filling and molding operation. Means are employed to raise or strip the mold after the filling and molding operation, to permit removal of the molded product and the pallets supporting the same. Means are provided for relieving any suction or vacuum action during the stripping operation, and a hydraulic driving and control mechanism is employed to actuate the several operations.

One form which the machine may assume is shown by way of illustration in the accompanying drawings, in which—

Fig. 1 is a side elevation of the machine, showing the rear side thereof.

Fig. 2 is a central, vertical, longitudinal section of the machine.

Fig. 3 is a plan view of Fig. 1.

Fig. 4 is a longitudinal plan section taken on line IV—IV, Fig. 2.

Fig. 5 is a cross-section of the machine, taken on line V—V, Fig. 1.

Fig. 6 is a cross-section taken on line VI—VI, Fig. 1.

Fig. 7 is a detail sectional view of one of the gears.

Fig. 8 is a plan view of the main valve chest.

Fig. 9 is a side elevation of the same.

Fig. 10 is a cross-section taken on line X—X, Fig. 8.

Fig. 11 is a cross-section taken on line XI—XI, Fig. 8.

Fig. 12 is a diagrammatic view showing the hydraulic driving and controlling mechanism.

Referring to the drawings in detail, particularly Figs. 1, 2, 5 and 7, A indicates in general a main frame which may be constructed in any suitable manner. In this instance it is shown as constructed of structural iron, such as channel beams, angle bars, etc. The frame consists of vertical uprights 2 which are tied by cross-beams and longitudinal bars, such as indicated at 3. Connecting the upright members 2 at suitable intervals are a number of cross-beams 4 which form a support for a pair of angle bars such as indicated at 5. These angle bars extend from end to end of the machine, and each bar carries a plurality of rollers such as indicated at 6. These rollers form a conveyor which extends from end to end of the machine, and the conveyor serves the function of a support for a series of pallets such as indicated at 7. Empty pallets are delivered to the end of the machine indicated at B and means is employed to advance the pallets with a step by step movement from one end of the machine to the other.

The pallet advancing or feeding mechanism consists of a cross head 8 which is secured to the outer end of a piston rod 9. The inner end of the rod is attached to a piston 10 which operates in a cylinder 11. The piston is hydraulically actuated, and combination inlet and outlet pipes 12 and 13 are arranged on opposite ends of the cylinder so as to impart a reciprocal movement to the piston, the piston rod 9 and the cross head 8. When the cross head and connected mechanism travels in the direction of arrow $a$ (see Fig. 2) the pallets will be advanced along the roller conveyor. That is, empty pallets will be delivered to the mold generally indicated at C while pallets filled or loaded with the molded product will be discharged from the opposite end of the conveyor indicated at D. When discharging pallets loaded with the molded product, it should be realized that the molded product is in a plastic condition. That is, the molded product is removed from the mold before the cement commences to set. It is accordingly essential that a sudden jar or jolting movement must not be transmitted to the pallets when they are loaded with the molded product. A valve 14 has accordingly been placed in the pipe line indicated at 12. This valve normally assumes a substantially closed position. The valve is provided with a handle such as shown at 15. The upper end of the handle is curved, while the lower end of the handle is connected with a spring 16 and also with a chain 17, the opposite end of the chain being attached to the cross head as shown in Fig. 2. If fluid under pressure is admitted through the pipe 12 it is momentarily checked by the substantially closed valve 14. Water will, however, slowly pass through the valve and as such will impart a slow movement to the piston, the cross head and the pallets moved thereby.

However, as the cross head and the pallets advance the chain 17 slackens while the spring 16 exerts a pull. During this slow movement the valve will accordingly gradually open and when the handle assumes the dotted line position indicated at 14a it will be fully open and maximum speed will then be transmitted to the cross head and the pallets. In other words, movement transmitted to the pallets is slow during the starting period and is then gradually accelerated until the valve assumes full open position. From then on, the cross head and the pallets travel at maximum speed. As the cross head approaches the end of its stroke the valve is again slowly closed, and the movement of the cross head and the pallets as it comes to a stop position is gradually slowed up so that the molded product will not be shaken or jolted. This is accomplished by providing an extension 18 on the lower side of the cross head. This extension engages the upper end of the arm 14 and this engagement swings the valve handle back to the full line position where the valve is substantially closed, thus slowly shutting off the fluid supply to the cylinder and thereby slowing down or checking the stopping movement. The means for delivering fluid under pressure to the pipes 12 or 13 will hereinafter be described.

The mold indicated at C may be constructed in any suitable manner, depending upon whether bricks, blocks or tile are to be made. In the present instance a brick mold is illustrated. The mold is in this instance supported in a secondary frame which is perhaps best illustrated in Figs. 1, 5 and 6. The frame consists of pairs of upright members 19 which are connected at their lower ends by means of cross beams 20. The upper ends are provided with short arms 21 which are secured at their inner ends to the mold C. The secondary frame, together with the mold, is adapted to be raised and lowered with relation to the pallets, and the following mechanism is employed.

Referring to Figs. 1, 2 and 6, it will be noted that the main frame A is provided with two cross-shafts such as shown at 22. Secured on each cross-shaft is a pair of crank arms 23, and extending outwardly from the crank arms are links 24 which are pivotally attached to the cross-beams 20. Arranged on each side of the main frame are interspaced pairs of guide bars such as shown at 25, the spacing between the guide bars being sufficient to receive the cross-beams 20 and the short upper arms 21, the guide bars serving the function of guides for the cross-beams 20 and the upper short arms 21, thereby insuring vertical movement when the mold is to be raised with relation to the molded product. The secondary frame is also guided laterally with relation to the main frame A by means of blocks such as shown at 26. These blocks may be secured either to the main frame or the secondary frame, but they must be constructed of a resilient material, such as rubber or the like, as a shaking movement is transmitted to the secondary frame during the filling of the mold, as will hereinafter be described.

The secondary frame and the mold carried thereby are raised and lowered by imparting a rotary motion to the cross-shafts 22. Rotary motion is transmitted to these shafts through a hydraulic cylinder such as indicated at 27. (See Fig. 1.) This cylinder is provided with a piston 28 and a piston rod 29. The outer end of the rod is connected with one of the shafts 22 through means of a rocker arm 30. A similar rocker arm 31 is secured on the opposite cross-shaft 22. The upper and lower ends of the rocker arms 30 and 31 are connected by means of links 32. Hence, when reciprocal movement is transmitted to the piston and the rod 29 in the direction of arrow b, shafts 22 will be rotated in a direction to swing the crank arms 23 upwardly, and as the crank arms 23 are connected with the secondary frame by means of the links 24, an upward movement will be transmitted to the secondary frame and the mold carried thereby. Conversely, if reciprocal movement is transmitted to the piston rod 29 in the opposite direction, the rotation of the shafts 22 will be reversed and the secondary frame and the mold will be lowered. The piston 28 and the cylinder 27 are hydraulically operated and means for delivering fluid under pressure thereto and for controlling the same will hereinafter be described.

Extending longitudinally of the main frame A is a pair of angle bars such as indicated at 33. (See Fig. 5.) These angle bars form a trackway which extends from end to end of the main frame, and this trackway serves as a support for a concrete hopper generally indicated at 34. Rollers are arranged on opposite sides of the hopper as indicated at 35 and 36, and means are employed for moving the hopper from its normal stationary position, shown at 34a in Fig. 1, to the opposite end of the frame, and vice versa. That is, the hopper is in reality provided with a carriage-like support and it may be moved on this carriage from end to end of the machine on the trackway formed by the angle bars 33. During this movement it passes over the mold C and the concrete is then automatically discharged into the mold to fill the same. The hopper proper is in this instance shown as consisting of two end plates 34b and 34c. Secured between the end plates are inclined side plates such as shown at 37. These plates are spaced apart at the lower end as shown at 38 to form a discharge opening through which the concrete may escape when the hopper is passed over the mold. The hopper is filled from any suitable source of supply when it assumes the position shown at 34a, and means must accordingly be provided for closing the lower end of the hopper when it is being filled. A stationary bottom section or plate 39 is accordingly employed. A similar stationary plate is disposed at the opposite end of the machine as indicated at 39a. Concrete will accordingly only discharge when the hopper is moved over the mold, and discharge when any other position is assumed will be prevented by the bottom plates 39 and 39a. In actual practice the hopper is moved rapidly back and forth over the mold so that the mold may be rapidly filled and the concrete smoothed off when the filling operation is completed. Scraping or screed bars are accordingly employed. These are pivotly mounted at opposite sides of the hopper as shown at 40. One screed bar or scraper will operate when the hopper is moving in one direction, and the other when the hopper is moving in the opposite direction, the movement of the screed bars being limited by adjustable stop screws such as indicated at 41.

The mechanism for transmitting rapid movement to the hopper back and forth over the mold is also hydraulically controlled. It consists of a cylinder such as indicated at 42. (See Fig. 2.) Mounted within the cylinder is a piston 43, and secured to the piston is a piston rod 44 which extends through opposite ends of the cylinder. Arranged at each end of the machine, on the main frame A, is a cross-shaft, one being indicated at 45 and the other at 46. Secured on each cross-shaft is a pulley 47 and wound around each pulley and secured thereto is a cable 48, the opposite ends of the cables being secured to the opposite ends of the piston rod 44 as indicated at 49. Hence, if reciprocal movement is transmitted to the piston 43 and the rod 44, rotary movement will be transmitted to the pulleys 47 and the shafts 45 and 46, the direction of rotation depending upon the direction of movement of the piston and the rod. Secured on the respective cross-shafts 45 and 46 are pairs of pulleys 50 and 51 which are considerably larger in diameter than the pulleys 47. These pulleys serve the function of transmitting a reciprocal movement to the hopper, this being accomplished by securing a pair of cables to each side of the hopper as indicated at 52 and 53. The opposite ends of the cables are secured to the pulleys 50 and 51 as shown at 54, and the hopper is accordingly pulled along the trackway by means of the cables 52 and 53, in one direction or another, depending upon the direction of rotation of the pulleys. The means for delivering fluid under pressure to the cylinder 42 and the regulation thereof will hereinafter be described.

During the filling operation of the mold it is essential that a tight contact be maintained between the lower end of the mold and the pallets. To insure a tight connection a secondary support is provided. This is best illustrated in Figs. 4, 5 and 6. Supported by the cross-beams 4 and extending longitudinally of the machine is a pair of beams 60. Interposed between the top of the beams and the pallets 7 is a pair of tubes 61. These tubes are constructed of rubber, canvas or any other flexible or resilient material. They are held in position on top of the beam 60 by side plates 62, and they are covered to protect them from excess wear, by a canvas strip such as indicated at 63. The tubes 61 are normally deflated, but fluid under pressure is delivered to the tubes when the mold is lowered, and a tight contact is required between the mold and the pallets. That is, fluid under pressure delivered to the tubes 61 causes them to inflate or assume a rounded position, as shown in Fig. 5. When so inflated they raise the pallet upwardly against the bottom of the mold, and such a pressure is at the same time exerted that a tight fit is maintained between the pallets and the mold. Furthermore, a resilient support is provided for the pallets and the mold, this being essential, as a horizontal shaking movement is transmitted to the pallets and the mold during the filling operation to settle the concrete in the mold during the filling operation. The tubes 61 are hydraulically actuated, and the mechanism controlling the same will hereinafter be described.

It was previously stated that a horizontal shaking movement was transmitted to the mold and the pallets during the filling operation. This mechanism is best illustrated in Figs. 5 and 7. The mechanism consists of a housing generally indicated at E which is secured to one side and near the upper end of the secondary frame. Journaled within the housing is a pair of intermeshing gears 65 and 66. Each gear is provided with an off-center counterweight such as shown at 67. (See Fig. 7.) The secondary frame also supports an electric motor or the like, near its lower end, as indicated at 68, and this motor drives the lowermost gear through pulleys and a belt, such as shown at 69, and as the gears are intermeshed they will be both rotated in unison when the motor 68 is in operation. The counter-weights 67 employed are so positioned that they will oppose each other and render their action neutral as far as vertical vibration or shaking movement is concerned, but they co-operate to transmit a horizontal shaking movement. The horizontal shaking movement set up by the off-center weights is transmitted through a rod 70 which is attached to the secondary frame and the mold. The circuit through the motor 68 is controlled through an ordinary switch placed within convenient reach of the operator. He closes the switch when the hopper is traveling back and forth over the mold, and a horizontal shaking movement is accordingly transmitted to the mold during the filling operation, thereby insuring settling of the concrete and complete filling of the mold. When the mold has been filled and screeded, the switch is opened and the shaking or vibrating movement transmitted will cease. It is for this reason that the switch controlling the motor and the shaking mechanism is manually actuated so that it will be under complete control of the operator.

After the mold has been completely filled and leveled off by the screed bars or scrapers and the mold is to be lifted or stripped with relation to the molded product indicated at 72, (see Fig. 6) it is more or less essential to engage the upper ends of the molded bricks, or product, while the mold is being raised. A push-out frame generally indicated at 73 is employed for this purpose. It is pivotly supported as at 74 at one side of the main frame and it is partially counterbalanced by a weight such as shown at 75. The frame is provided with a series of push-out plates such as indicated at 76. These align with the respective openings in the mold and they exert a downward pressure on the molded product while the mold is being raised. The push-out frame is lowered into position by means of a hydraulic mechanism consisting of a cylinder 77, a piston 78 and a piston rod 79, this rod being attached at its outer end to a crank arm 80 which is secured to the shaft or pivotal point 74. The frame drops by gravity when fluid under pressure is released from the cylinder and when it reaches the horizontal position shown in Fig. 6 it is locked with relation to the main frame by means of a latch 81 and it is held in this locked position during the stripping or upward movement of the mold. The mechanism controlling the flow of fluid to the cylinders 77 will hereinafter be described.

It will be noted when reviewing the description so far submitted, that each mechanism is hydraulically actuated. Means for supplying a liquid or fluid under pressure must accordingly be provided. The means employed in this instance is a centrifugal pump such as indicated at 84, (see Fig. 12) and a supply tank 85. The pump is provided with a main discharge line 86 which delivers liquid under pressure to the several cylinders. A main valve assembly generally indicated at F is interposed between the supply pipe 86 and the secondary supply lines connected with the several cylinders, and a hand-controlled pilot valve mechanism, generally indicated at G, is in turn interposed between the main valve assembly and the supply pipe 86.

The main valve mechanism or assembly shown at F (see Figs. 8, 9, 10 and 11) consists of an elongated valve chest 87 on the opposite sides of which are arranged a return manifold 88 and a supply manifold 89. The supply pipe 86 connects with the valve chest at the point indicated at 90. A port is formed in the side of the valve chest as indicated at 91 and this communicates with the supply manifold 89. A main return pipe is employed as indicated at 92. This connects with the opposite end of the valve chest as shown at 93 and it connects with the return manifold through means of a port 94. The opposite end of the return pipe 92 is connected with the supply tank 85 so that water or other fluid employed may be circulated and returned. The main part of the valve chest, intermediate the ports 90 and 93, is divided into a series of chambers such as shown at 95 by a series of cross partition walls 96. Ports 97 and 98 are formed on opposite sides of the valve chest, there being two ports for each chamber. A valve stem extends through each chamber as indicated at 99 and a pair of valves is mounted thereon as shown at 100 and at 101. Formed on the side of the supply manifold 89 are a series of cylinders such as shown at 102. These cylinders align with the valve chest chambers 95 and each cylinder is provided with a piston 103 which is secured on the outer end of the valve stem 99. Each cylinder indicated at 102 is provided with a supply port 104. A fluid under pressure is delivered thereto to actuate the valves indicated at 100 and 101 as will hereinafter be described. Each valve chest chamber 95 is provided with valves such as shown at 100 and 101 and with an actuating cylinder and piston such as indicated at 103. A description of one should accordingly suffice as they are all identical in construction and arrangement. Each valve chest chamber is provided with an upper port 105 which alternately acts as an inlet or outlet port.

The several valves mounted in the main valve chest F are actuated by hand-controlled pilot valves generally indicated at 106, 107, 108 and 109. These are placed within convenient reach of the operator. The valve shown at 106 is an ordinary three-way valve, while the valves shown at 107, 108 and 109 are four-way valves. That is, each of the valves shown at 107, 108 and 109 is provided with inlet ports as shown at 110 which are connected with the supply pipe 86 through means of pipes 111. Each of the valves is provided with discharge pipes as shown at 112 and each valve is provided with a combination supply and return pipe as indicated at 113 and 114. The discharge pipes 112 all connect with a common return pipe 115 which in turn is connected through a pipe 116 with the main return pipe 92.

The operation of the machine will be as follows:

A number of empty pallets are first placed on the receiving end of the conveyor which is indicated at B, and the hopper 34 is filled with concrete. It is next necessary to move the empty pallets into alignment with the mold indicated at C. This is accomplished as follows: With the pump 84 in operation and the pipe 86 supplied with water under pressure, it will be necessary for the operator to turn the pilot valve 107 so that the water from the supply pipe 86 will pass through the pipe 111 and the pipe 113 into the supply port 104 of the cylinder 102a. This will cause the piston 103 therein to move outwardly. It will cause the valve 100 to close against port 97 and the valve 101 to open with relation to the port 98, and as the supply manifold 89 is full of water under pressure supplied through ports 90 and 91, water under pressure will enter the co-operating chamber 95 of the valve chest and it will discharge through the port 105. This is connected with cylinder 11 through means of pipe 13. The piston 10 in the cylinder will accordingly move to its extreme outward position ready for the cross head 8 to engage the empty pallets and to move them forward on the return stroke into alignment with the mold C. The valve 14 which is automatically actuated by the cross head will during this movement cause the cross head to start up with a slow speed and similarly to slow down gradually as the end of the stroke is reached. This deceleration of the movement of the piston, the cross head and the pallets actuated thereby would not be necessary if empty pallets only were handled, but it must be remembered that the empty pallets will later on be loaded with molded products in a plastic condition and that it will then be necessary to gradually accelerate the movement when starting and to decelerate the movement when stopping. This acceleration and deceleration is automatically taken care of by the valve 14 and the cross head as previously described. While the pallets are moving forwardly water previously delivered to the cylinder 11 will discharge through the pipe 13 and the valve 14. The pipe 12 connects with one of the chambers 95 of the main valve chest, and the co-operating valves 100 and 101 will in that instance assume the position shown in Fig. 8. That is, port 98 will be closed while port 97 will be open. The water forced out by the piston 10 through the opposite end of the pipe 13 will accordingly enter the valve chamber 95 through port 105 and it will discharge through port 97 into the return manifold 88 from where it will escape through the ports 93 and 94 into the pipe 92 which returns it to the supply tank 85. When the empty pallets have been moved forward into alignment with the mold, cross head 8 may be returned by the operator merely by reversing the position of the valve 107. When this valve is reversed water will flow from the supply pipe 86 through the pipe 111 into the valve and will be directed by the valve into the pipe 114. This in turn delivers the water to the supply port 102b of the cylinder 102, and the piston 103 which is mounted therein will be moved outwardly. Valves 100 and 101 will accordingly reverse their position and water under pressure will now be delivered to the pipe 12 while it will be returned from the cylinder 11 through pipe 13. The water previously admitted to the cylinder 102a will at the same time return to pipe 113 and will be directed through the valve to pipe 112 which connects with pipes 115 and 116. These are in turn connected with the pipe 92 and the water is accordingly returned to the tank 85. The pallets are now in position and the cross head has been returned. It is next necessary to lower the mold with relation to the pallets and at the same time to raise the pallets into tight contact with relation to the lower end of the mold. This is accomplished by the operator through means of the pilot valve 109. That is, he swings the valve so that the water from pipes 86 and 111 will enter the pipe 113. It is thus delivered under pressure to the cylinder 102 and as such forces the piston 103 outwardly. Valve 100 co-operating therewith is accordingly closed while the valve 101 is opened. Water under pressure will accordingly enter the pipe shown at 117 and as such will be delivered to one side of the piston 28 which is mounted in the cylinder 27

The piston will move in the direction of the arrow (see Fig. 12) and as such will transmit a rocking movement to the shafts 22. The crank arms 23 will swing downwardly in unison and as they are connected to the secondary frame through means of the links 24, the secondary frame, together with the mold, will be lowered. A three-way valve such as shown at 118 (see Figs. 6 and 12) is mounted adjacent the secondary frame. The handle of the valve is engaged by one or another of the pins indicated at 119. Thus when the secondary frame and mold is being lowered the valve 118 is swung to open position. Water under pressure from the supply pipe 86 is delivered to valve 118 through a pipe such as indicated at 120. The water passing through the valve is directed to the pipe 121. This in turn delivers the water to the inlet port 102c. This forces the piston 103 outwardly and the co-operating valve 100 is closed while the valve 101 is opened. Water under pressure will thus enter the pipe indicated at 122. This pipe is connected with the flexible tubes or hose members shown at 61. The water under pressure entering the hose inflates them and as they are being inflated they raise the pallets upwardly into tight contact with the bottom of the mold and at the same time form a flexible resilient support for the pallets and the mold. In other words, valve 118 is entirely automatically actuated, as it is controlled by the upward or downward movement of the secondary frame and the mold. When the mold is lowered valve 118 is opened and water under pressure is admitted to the tube 61. Conversely, when the secondary frame and the mold are raised when stripping the molded product the position of the valve 118 is reversed and the water previously admitted to the cylinder 102c will discharge through pipe 120a and pipes 116 and 92 and as such will be returned to the tank.

The mold has now been lowered and the pallets have been raised into tight contact with the lower end thereof. The mold is now ready for the reception and molding of the concrete and this is accomplished by moving the hopper 34 back and forth over the mold as has been previously described. The movement of the hopper is controlled by means of the cylinder 42. This is provided with two pipes such as shown at 125 and 126, and the flow or return of water through said pipes is controlled by the pilot valve indicated at 108. This pilot valve controls the flow of water to the co-operating cylinders 102d and 102e. These in turn actuate the co-operating valves 100 and 101, and water under pressure will accordingly be alternately admitted and discharged from opposite ends of the cylinder 42. A reciprocal movement is thus transmitted to the piston and this is in turn transmitted through the cross-shafts 45 and 46 and the co-operating pulleys and cables indicated at 52, 53, etc.

During the filling operation it is essential that the concrete should become thoroughly settled in the mold to insure complete filling and to avoid the formation of any voids or air pockets. Means have accordingly been provided for transmitting a horizontal shaking movement to the mold and the pallets supporting the same during the filling operation. The means employed are the gears indicated at 65 and 66. (See Figs. 5 and 7.) These are driven by electric motor 68 and as previously stated the circuit therethrough is controlled by an ordinary electric switch placed within convenient reach of the operator. He merely closes the switch when he starts the filling operation and opens the switch to break the circuit when the filling operation has been completed.

After the filling operation is completed it is necessary to raise the mold to strip it with relation to the concrete and to simultaneously lower the pallets back to the roller conveyor. This is accomplished by first opening the three-way valve indicated at 106. That is, the valve is swung by the operator so that it will release water under pressure in the cylinder 102f. The water released discharges through pipe 130 and the valve and is returned to the tank through pipes 115, etc. The piston in the cylinder 102f is accordingly moved inwardly. The co-operating valve 100 is opened and the valve 101 is closed. Water from the cylinder 78 will accordingly discharge through pipe 131. The piston in the cylinder 78 will accordingly move upwardly and the push-out frame will swing from the dotted line position to the full line position shown at 73 in Fig. 6. It is here locked and secured with relation to the main frame by means of the latch 81. The pilot valve 109 is next swung by the operator to reverse its position. This will cause water under pressure to enter cylinder 27 through pipe 117 and to discharge through pipe 117a. The movement of the piston 28 will be in a direction opposite to that previously described. The movement of the cross-shafts 22 will be reversed and the secondary frame and the mold will be raised. As the secondary frame is raised the position of the valve 118 will be reversed and the water previously admitted to the tubes 61 will be liberated and the tubes will become deflated, thereby lowering the loaded pallets until they engage with the roller conveyor. Valve 107 is next reversed causing the piston 10 and the cylinder 11 to again travel forwardly. A new lot of empty pallets will accordingly be moved into alignment with the mold, while the pallets loaded with the molded product will be forced ahead of them to the discharge end of the conveyor, from where they may be removed in any suitable manner. When the empty pallets are in position, cross head 8 may be returned. Valve 109 is again reversed and the mold will be lowered and the pallets simultaneously raised by automatic actuation of valve 118 which causes inflation of the tubes 61. The push-out frame is then raised by releasing the latch 81 and reversing the position of the valve 106. This will now admit water under pressure through pipe 130 to cylinder 102f. Co-operating valves 100 and 101 will automatically assume a position where water under pressure will enter pipe 131. The piston in the cylinder 78 will accordingly be lowered and the push-out frame 73 will be raised to assume the dotted line position shown in Fig. 6. The molds are now ready to be filled and this is accomplished by moving the concrete hopper over the mold as previously described.

The several cycles of operation have been completed. It should accordingly be clear that each operation is hydraulically actuated and hydraulically controlled through means of the pilot valves 106, 107, 108 and 109. These pilot valves, together with the switch controlling the circuit through the motor 68, are as previously described placed within convenient reach of the operator and as such may be quickly and readily manipulated in successive order as the several cycles of operation take place. Each operation is within full control of the operator and the time of operation may accordingly be increased or decreased as the judgment of the operator or circumstances may demand.

While certain features of the present invention are more or less specifically described, we wish it understood that various changes may be resorted to within the scope of the appended claims; similarly, that the materials and finishes of the several parts employed may be such as the manufacturer may decide or varying conditions or uses may demand.

Having thus described our invention, what we claim and desire to secure by Letters Patent is:

1. In a machine of the character described, a mold, a support below the mold, a pallet supported thereby and forming a bottom for the mold, and resilient means operable independent of the support for holding the pallet tightly against the lower end of the mold.

2. In a machine of the character described, a mold, a support below the mold, a pallet supported thereby and forming a bottom for the mold, and hydraulic means operable independent of the support for holding the pallet tightly against the lower end of the mold.

3. In a machine of the character described, a mold, a support below the mold, a pallet supported thereby and forming a bottom for the mold, a secondary support, a pair of flexible normally collapsed tubes interposed between the secondary support and the pallet, and means for filling the tubes with a fluid under pressure to extend the same so as to hold the pallet tightly against the lower end of the mold.

4. In a machine of the character described, a mold, a support below the mold, a pallet supported thereby and forming a bottom for the mold, a secondary support, a pair of flexible normally collapsed tubes interposed between the secondary support and the pallet, means for raising and lowering the mold with relation to the pallet, a valve controlling the flow of a fluid under pressure to the tubes to inflate or deflate the same, and means operable in conjunction with the mold raising and lowering mechanism for automatically changing the position of the mold so that the tubes will be inflated during lowering of the mold and conversely deflated during raising of the mold.

5. In a machine of the character described, a frame, a concrete hopper, a mold disposed below the hopper, a cylinder, a piston in the cylinder, manually controlled means whereby a fluid under pressure is introduced to opposite ends of the cylinder to impart a reciprocal movement to the piston, a trackway on the frame and forming a support for the concrete hopper, and means connecting the piston and the hopper whereby a reciprocal movement is transmitted to the hopper longitudinally of the frame and over the mold to fill the same.

6. In a machine of the character described, a frame, a concrete hopper, a mold disposed below the hopper, means for transmitting a reciprocal movement to the hopper longitudinally of the frame and over the mold to fill the mold, and means for shaking the mold during the filling operation to settle the concrete therein.

7. In a machine of the character described, a frame, a concrete hopper, a mold disposed below the same, a cylinder, a piston in the cylinder, a piston rod secured to the piston and extending through opposite ends of the cylinder, a pair of pulleys journaled in the frame, one at each end thereof, a pair of cables secured at their outer ends to the respective pulleys and at their inner ends to the piston rod, manually controlled means whereby a fluid under pressure is introduced to opposite ends of the cylinder to impart a reciprocal movement to the piston and to rotate the pulleys, a track-way in the frame forming a support for the concrete hopper, and a second set of cables secured to the pulleys at one end and to the concrete hopper at the opposite end so that rotation of the pulleys will be transmitted to impart a reciprocal movement to the concrete hopper longitudinally of the frame and over the mold so as to fill the mold.

8. In a machine of the character described, a frame, a concrete hopper, a mold disposed below the same, a cylinder, a piston in the cylinder, a piston rod secured to the piston and extending through opposite ends of the cylinder, a pair of pulleys journaled in the frame, one at each end thereof, a pair of cables secured at their outer ends to the respective pulleys and at their inner ends to the piston rod, manually controlled means whereby a fluid under pressure is introduced to opposite ends of the cylinder to impart a reciprocal movement to the piston and to rotate the pulleys, a track-way in the frame forming a support for the concrete hopper, a second set of cables secured to the pulleys at one end and to the concrete hopper at the opposite end so that rotation of the pulleys will be transmitted to impart a reciprocal movement to the concrete hopper longitudinally of the frame and over the mold so as to fill the mold, and scraper members carried by the concrete hopper to level off the concrete when the mold is filled.

9. In a machine of the character described, a frame, a concrete hopper, a mold disposed below the same, a cylinder, a piston in the cylinder, a piston rod secured to the piston and extending through opposite ends of the cylinder, a pair of pulleys journaled in the frame, one at each end thereof, a pair of cables secured at their outer ends to the respective pulleys and at their inner ends to the piston rod, manually controlled means whereby a fluid under pressure is introduced to opposite ends of the cylinder to impart a reciprocal movement to the piston and to rotate the pulleys, a track-way in the frame forming a support for the concrete hopper, a second set of cables secured to the pulleys at one end and to the concrete hopper at the opposite end so that rotation of the pulleys will be transmitted to impart a reciprocal movement to the concrete hopper longitudinally of the frame and over the mold so as to fill the mold, scraper members carried by the concrete hopper to level off the concrete when the mold is filled, and means for imparting a shaking movement to the mold during the filling operation to settle the concrete therein.

10. In a machine of the character described, a main main frame, a secondary frame, a mold supported by the secondary frame, a pallet co-operating with the mold and forming a bottom therefor, a support for the pallet, means for delivering concrete to the mold to fill the same, and means connected with the secondary frame for imparting a shaking movement to the secondary frame and the mold to settle the concrete during the filling operation.

11. In a machine of the character described, a main frame, a secondary frame, a mold supported by the secondary frame, a pallet co-operating with the mold and forming a bottom therefor, a support for the pallet, means for delivering concrete to the mold to fill the same, means connected with the secondary frame for imparting a shaking movement to the secondary frame and the mold to settle the concrete during the filling operation, means for raising the secondary frame and the mold with relation to the molded article, and means for removing the pallet with the molded article and for delivering an empty pallet to the mold.

12. In a machine of the character described, a main frame, a secondary frame, a mold secured to the secondary frame, a roller conveyor on the main frame and forming a support for one or more pallets, means for moving the pallets along the conveyor into alignment with the mold, flexible means operable independent of the conveyor for raising the pallets tightly up against the lower end of the mold, a pair of gears journaled on the main frame, a pair of counterweights, one on each gear, said gears intermeshing, and means for rotating the gears, said counterweights being so positioned that they will only impart a horizontal shaking movement to the secondary frame, the mold and the pallet co-operating therewith.

13. In a machine of the character described, an elongated main frame, a roller conveyor in the frame and extending substantially from end to end thereof, a plurality of pallets adapted to be supported by the roller conveyor, a mold disposed in the frame above the conveyor and the pallets, a cylinder disposed in the frame, a piston in the cylinder, a piston rod connected with the piston and extending through one end of the cylinder, a cross-head attached to the outer end of the piston rod, said cross-head having a projection which is adapted to engage the pallets, means for admitting a fluid under pressure to either end of the cylinder so as to impart a reciprocal movement to the piston and the cross-head whereby the pallets are moved longitudinally on the conveyor and into register with the mold, and a valve in the fluid connection which is adapted to slowly open at the beginning of the stroke and slowly close near the end of the piston stroke, so as to start the movement of the pallets along the conveyor slowly and similarly stop the movement slowly.

14. In a machine of the character described, a main frame, a secondary frame, a mold supported by the secondary frame, a pallet co-operating with the mold, a support in the main frame for the pallet, a secondary support for the pallet adapted to raise the pallet into tight contact with the bottom of the mold, a track-way in the main frame, a concrete hopper supported by the track-way, means for imparting movement to the hopper longitudinally of the frame and above the mold to fill the same, means for imparting a shaking movement to the frame during the filling operation to settle the concrete, means for raising the mold with relation to the pallet after the filling operation to strip the molded article, and means for imparting longitudinal movement to the pallet and the molded article mounted thereon to discharge it from the machine, and for simultaneously delivering an empty pallet into alignment with the mold.

15. In a machine of the character described, a main frame, a secondary frame, a mold supported by the secondary frame, a pallet co-operating with the mold, a support in the main frame for the pallet, a secondary support for the pallet adapted to raise the pallet into tight contact with the bottom of the mold, a track-way in the main frame, a concrete hopper supported by the track-way, means for imparting movement to the hopper longitudinally of the frame and above the mold to fill the same, means for imparting a shaking movement to the frame during the filling operation to settle the concrete, means for raising the mold with relation to the pallet after the filling operation to strip the molded article, means for imparting longitudinal movement to the pallet and the molded article mounted thereon to discharge it from the machine, and for simultaneously delivering an empty pallet into alignment with the mold, hydraulic means supplying power to operate the several mechanisms, and manually controlled means for actuating the hydraulic power whereby each mechanism is manually controlled.

16. In a machine of the character described, a main frame, a secondary frame, a mold supported thereby, a cylinder, a piston within the cylinder, means for admitting a fluid under pressure to either end of the cylinder to impart a reciprocal movement to the piston, means whereby reciprocal movement of the piston is transmitted to raise or lower the secondary frame and the mold carried thereby, a pallet adapted to co-operate with the mold to form a bottom therefor, means for supporting the pallet, a secondary support, a pair of flexible tubes interposed between the secondary support and the pallet, a valve controlling a flow of fluid under pressure to said tubes to extend or deflate the same, and means actuated by movement of the secondary frame for automatically opening a valve to admit the fluid to the flexible tubes and conversely for reversing the position of the valve to permit discharge of the fluid.

17. In a machine of the character described, a main frame, a conveyor extending longitudinally thereof, a plurality of pallets mounted on the conveyor, a cylinder, a piston mounted therein, a piston rod secured to the piston and extending through one end of the cylinder, a cross-head on the rod and engageable with the pallets, means for admitting a fluid under pressure to either end of the cylinder to impart a reciprocal movement to the piston, the rod and the cross-head, and through the cross-head to move the pallets along the conveyor, and a valve actuated by the movement of the piston for accelerating the movement of the piston at the beginning of the stroke and for decelerating during the end of its stroke so as to start the pallets along the conveyor with a slow movement, and similarly to stop them with a slow movement.

18. A machine for molding concrete units comprising, a frame; a horizontally disposed guideway on said frame; a pallet to rest in a horizontal position on said guideway; a horizontally disposed mold open on its top and bottom sides having said pallet arranged thereunder and in spaced relation to the open bottom thereof; means to raise the pallet from the guideway into engagement with the bottom of the mold during the molding operation and to thereafter lower the pallet onto the guideway; means to raise the mold away from the pallet onto the guideway; means to raise the mold away from the pallet to free the contents of the mold onto the pallet; and means to vibrate the mold during the molding operation and during the initial movement of the mold away from the pallet.

ALBERT R. SHINN.
JOSEPH T. VOORHEIS.